(12) United States Patent
Zhong

(10) Patent No.: US 8,589,675 B2
(45) Date of Patent: Nov. 19, 2013

(54) WLAN AUTHENTICATION METHOD BY A SUBSCRIBER IDENTIFIER SENT BY A WLAN TERMINAL

(75) Inventor: Zhen Zhong, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/368,701

(22) Filed: Feb. 8, 2012

(65) Prior Publication Data

US 2012/0144189 A1 Jun. 7, 2012

Related U.S. Application Data

(63) Continuation of application No. PCT/CN2010/071440, filed on Mar. 31, 2010.

(30) Foreign Application Priority Data

Aug. 11, 2009 (CN) .......................... 2009 1 0091175

(51) Int. Cl.
- *G06F 15/16* (2006.01)
- *H04W 12/06* (2009.01)
- *H04L 9/32* (2006.01)

(52) U.S. Cl.
USPC ........... 713/155; 709/225; 709/226; 709/229; 705/67; 380/258; 726/7

(58) Field of Classification Search
USPC ............. 713/155; 380/247–250, 258; 705/67; 709/225, 226, 229
See application file for complete search history.

(56) References Cited

U.S. PATENT DOCUMENTS

| | | | | |
|---|---|---|---|---|
| 6,025,038 A * | 2/2000 | Dowben et al. | ............... | 427/554 |
| 7,514,266 B2 * | 4/2009 | Anslyn et al. | ................. | 436/140 |
| 7,582,453 B2 * | 9/2009 | Zhong et al. | .................. | 435/101 |
| 7,885,644 B2 * | 2/2011 | Gallagher et al. | ......... | 455/414.2 |
| 7,906,314 B2 * | 3/2011 | Zhong et al. | ............... | 435/255.1 |
| 8,169,958 B2 * | 5/2012 | Torres et al. | .................. | 370/329 |
| 8,306,988 B1 * | 11/2012 | Jyoti et al. | .................... | 707/754 |
| 8,370,461 B2 * | 2/2013 | Zhong | ........................... | 709/219 |

(Continued)

FOREIGN PATENT DOCUMENTS

| | | |
|---|---|---|
| CN | 1523923 A | 8/2004 |
| CN | 1538706 A | 10/2004 |

(Continued)

OTHER PUBLICATIONS

Pages 1-9, CN 1547405 A, 20041117, Yan Xiongwei.*

(Continued)

*Primary Examiner* — Haresh N Patel
(74) *Attorney, Agent, or Firm* — Conley Rose, P.C.; Grant Rodolph; Nicholas K. Beaulieu

(57) ABSTRACT

An authentication method, a server, and a terminal for a wireless local area network (WLAN) are provided. The method includes: redirecting a Hypertext Transfer Protocol (HTTP) request message sent by a WLAN terminal to an address of a login webpage of a WLAN network and returning the redirected HTTP request message to the WLAN terminal; sending authentication request information carrying an International Mobile Subscriber Identity (IMSI) identifier of a Subscriber Identity Module (SIM) card sent by the WLAN terminal to an Authentication/Authorization/Accounting (AAA) server corresponding to the address of the login webpage of the WLAN network, such that the AAA server performs authentication based on the IMSI identifier.

20 Claims, 6 Drawing Sheets

(56) References Cited

U.S. PATENT DOCUMENTS

| | | |
|---|---|---|
| 2005/0181486 A1* | 8/2005 | Zhong et al. .................. 435/101 |
| 2005/0181487 A1* | 8/2005 | Zhong et al. .................. 435/101 |
| 2006/0024834 A1* | 2/2006 | Anslyn et al. ................... 436/93 |
| 2006/0046693 A1* | 3/2006 | Tran et al. ..................... 455/411 |
| 2006/0209794 A1* | 9/2006 | Bae et al. ...................... 370/352 |
| 2007/0022289 A1* | 1/2007 | Alt et al. ....................... 713/168 |
| 2007/0086979 A1* | 4/2007 | Chevrier et al. ............. 424/85.1 |
| 2007/0238448 A1* | 10/2007 | Gallagher et al. ......... 455/414.2 |
| 2009/0081213 A1* | 3/2009 | Chevrier et al. ........... 424/133.1 |
| 2009/0081231 A1* | 3/2009 | Chevrier et al. ........... 424/142.1 |
| 2009/0148462 A1* | 6/2009 | Chevrier et al. ........... 424/158.1 |
| 2009/0215646 A1* | 8/2009 | Anslyn et al. ................... 506/12 |
| 2009/0245184 A1* | 10/2009 | Torres et al. .................. 370/329 |
| 2010/0135992 A1* | 6/2010 | Rother et al. .............. 424/133.1 |
| 2010/0153742 A1* | 6/2010 | Kuo et al. ..................... 713/189 |
| 2011/0149967 A1* | 6/2011 | Chen et al. .................... 370/392 |
| 2011/0162070 A1* | 6/2011 | Krasser et al. .................. 726/23 |
| 2012/0144189 A1* | 6/2012 | Zhong ........................... 713/155 |
| 2012/0209950 A1* | 8/2012 | Zhong et al. .................. 709/217 |
| 2013/0031111 A1* | 1/2013 | Jyoti et al. .................... 707/754 |
| 2013/0104230 A1* | 4/2013 | Tang et al. ...................... 726/23 |

FOREIGN PATENT DOCUMENTS

| | | |
|---|---|---|
| CN | 1547405 A | 11/2004 |
| CN | 1913439 A | 2/2007 |
| WO | 2004084464 A2 | 9/2004 |
| WO | WO 2007/114710 A2 | 10/2007 |
| WO | WO 2008/062098 A1 | 5/2008 |

OTHER PUBLICATIONS

Pages 1-5, CN 1538706 A, 20041020, Li Deer.*
International Search Report from the Chinese Patent Office in International Application No. PCT/CN2010/071440 mailed Jul. 8, 2010.
First Chinese Office Action of Chinese Application No. 200910091175.7 mailed Apr. 26, 2011.
Universal Mobile Telecommunications Systems (UMTS); 3G security; Wireless Local Area Network (WLAN) interworking security (3GPP TS 33.234 V 6.8.0 Release 6), ETSI TS 133 234, Third Generation Partnership Project, Mar. 2006.
Annex F (informative): Handling of the incompatibilities between the WLAN UE and the IUCC or SIM card inserted, 3GPP TS 33.234 V 6.8.0 Release 6, ETSI TS 133 234, Third Generation Partnership Project, Mar. 2006.
Extended European Search Report dated (mailed) Apr. 23, 2012, issued in related Application No. 10807869.2-1525, PCT/CN2010071440, Hauwei Technologies Co., Ltd.
Second Chinese Office Action dated (mailed) Mar. 22, 2012, issued in related Chinese Application No. 200910091175.7 Huawei Technologies Co., Ltd.
Written Opinion of the International Searching Authority (translation) dated (mailed) Jul. 8, 2010, issued in related Application No. PCT/CN2010/071440, filed Mar. 31, 2010, Huawei Technologies Co., Ltd.

* cited by examiner

WLAN AUTHENTICATION METHOD BY A SUBSCRIBER IDENTIFIER SENT BY A WLAN TERMINAL

CROSS-REFERENCE TO RELATED APPLICATION

This application is a continuation of International Application No. PCT/CN2010/071440 filed on Mar. 31, 2010, which claims priority of Chinese Patent application No. 200910091175.7, filed with the China Patent Office on Aug. 11, 2009 and entitled "WLAN Authentication Method, WLAN Authentication System, Server, and Terminal", both of which are hereby incorporated by reference in their entireties.

FIELD OF THE INVENTION

The present invention relates to the field of network communications, and in particular, to a wireless local area network (WLAN) authentication method, a WLAN terminal, a server of a WLAN gateway, and an authentication/authorization/accounting (AAA) server.

BACKGROUND OF THE INVENTION

At present, Wireless Local Area Network (WLAN) technologies and mobile communication technologies have been widely used. Many comprehensive operators are operating these two networks at the same time. However, these two types of networks have vast differences in operating mechanisms and authenticating mechanisms, the operator usually needs two different sets of subscriber management, authentication, accounting and service provision methods. Therefore, how to integrate these two types of networks together and realize uniform authentication, authorization, and accounting has become a hot research topic in the field of network communications.

For a WLAN network, identification and authentication of a subscriber identity generally relies on a unique account number and a corresponding password. A subscriber needs to input an account number and a corresponding password into an IE browser. Then, an Authentication/Authorization/Accounting (AAA) server identifies and authenticates the identity of the subscriber. For a mobile communication network, identification and authentication of a subscriber identity relies on a Subscriber Identity Module (SIM) card. Each SIM card identifies a unique identify of the subscriber, that is, International Mobile Subscriber Identity (IMSI). Therefore, a SIM card subscriber does not need to manually input an account number and a password. Instead, only the unique IMSI identification is required to complete the authentication process. Therefore, it is an ideal solution that the WLAN network can apply the current mechanism of using SIM for authentication to its own authentication system without the manual input of an account number and a password by the user to implement uniform authentication, authorization and accounting for the two types of networks.

In the conventional art, to achieve the above objective, the Internet Engineering Task Force (IETF) presents a SIM card authentication technology-based extensible authentication protocol (hereinafter, referred to as the EAP-SIM protocol). Theoretically, through this protocol, the WLAN network realizes completing the authentication by borrowing the SIM card.

Although the EAP-SIM protocol may theoretically realize SIM card-based authentication for the WLAN network, in practice, there are many disadvantages. Since the EAP-SIM protocol is situated at the relatively lower "network layer" in the Open System Interconnection (OSI) model, and the PC operating system has already been provided with the TCP/IP protocol stack, to realize EAP-SIM in the operating system of a PC, it is necessary to complete data interaction between the TCP/IP protocol layer and the "network layer" of the OSI model. However, the data interaction is extremely complex and is hard to implement technically. In addition, to realize the EAP-SIM protocol, a WLAN operator has to provide the subscriber with access points (APs) capable of transparently transmitting EAP-SIM messages, that is, the original APs of the WLAN network need to be modified.

SUMMARY OF THE INVENTION

Embodiments of the present invention provide a WLAN authentication method, a WLAN authentication system, a server and a terminal, which are aimed to provide an easily-implemented and SIM card-based authentication process for a WLAN network, so as to overcome the disadvantages in conventional art that when EAP-SIM protocol is used to implement SIM card-based authentication for a WLAN network, not only will the technical implementation be very complex, but also the operator has to change APs of the WLAN network.

An embodiment of the present invention provides a WLAN authentication method, where the method includes:

redirecting a Hypertext Transmission Protocol (HTTP) request message sent by a WLAN terminal to an address of a login webpage of the WLAN and returning the redirected HTTP requested message to the WLAN terminal; and sending authentication request information carrying a subscriber identifier of a subscriber identification module, which is sent by the WLAN terminal, to an AAA server corresponding to the address of the login webpage of the WLAN, such that the AAA server performs authentication based on the subscriber identifier.

An embodiment of the present invention provides a WLAN terminal, where the terminal includes:

a first receiving module, configured to receive a redirection message containing an address of a login webpage of a WLAN sent by a WLAN gateway; and a first sending module, configured to send authentication request information carrying a subscriber identifier of a subscriber identification module to the address of the login webpage of the WLAN, such that an AAA server corresponding to the address of the login webpage of the WLAN performs authentication based on the subscriber identifier.

An embodiment of the present invention provides a server of a WLAN gate, where the server includes:

a redirecting module, configured to redirect an HTTP request message of a WLAN terminal to a redirection message containing an address of a login webpage of the WLAN, and returning the redirection message to the WLAN terminal; and a forwarding module, configured to send authentication request information carrying a subscriber identifier of a subscriber identification module to an AAA server corresponding to the address of the login webpage of the WLAN, such that the AAA server performs authentication based on the subscriber identifier.

An embodiment of the present invention provides an AAA server, where the server includes:

a second receiving module, configured to receive authentication request information carrying a subscriber identifier of a subscriber identification module sent by a WLAN gateway;

a first acquisition module, configured to acquire first authentication data from a second generation (2G) mobile network authentication center, based on the subscriber identifier, in which the first authentication data includes a first random number, a first signature response, and a first encryption key, and acquire a second signature response and a second encryption key from a WLAN terminal, through the WLAN gateway, based on the first random number; and a second authentication module, configured to authenticate the WLAN terminal based on the first signature response and the first encryption key, and the second signature response and the second encryption key, if the first signature response is identical with the second signature response and the first encryption key is identical with the second encryption key, send through the WLAN gateway an authentication result of authentication success to the WLAN terminal, and if the first signature response is not identical with the second signature response and the first encryption key is not identical with the second encryption key, send through the WLAN gateway an authentication result of authentication failure to the WLAN terminal.

An embodiment of the present invention provides an AAA server, where the server includes:

a third receiving module, configured to receive authentication request information carrying a subscriber identifier of a subscriber identification module sent by a WLAN gateway;

a third acquisition module, configured to acquire second authentication data from a third generation (3G) mobile network authentication center, based on the subscriber identifier, in which the second authentication data includes a third random number, a first expected response, a first key, a first integrity key and an authentication token, and acquire through the WLAN gateway a second expected response from a WLAN terminal, based on the third random number and the authentication token; and a third authentication module, configured to authenticate the WLAN terminal based on the first expected response and the second expected response, if the first expected response is identical with the second expected response, send through the WLAN gateway an authentication result of authentication success to the WLAN terminal, and if the first expected response is not identical with the second expected response, send through the WLAN gateway an authentication result of authentication failure to the WLAN terminal.

An embodiment of the present invention provides a WLAN authentication system, where the system includes the WLAN terminal, the server of a WLAN gateway, and the AAA server.

According to the WLAN authentication method, the WLAN authentication system, the server and the terminal according to the embodiments of the present invention, by adding a WLAN gateway capable of redirecting the HTTP request message sent by the terminal to the address of address of the login webpage of the WLAN network between the WLAN user terminal and an authentication server, a webpage-based platform for performing authentication through a subscriber identification module of a mobile communication network is provided for a subscriber of a WLAN terminal, such that the authentication of a WLAN network can be implemented at the "application layer", that is, the topmost layer in the OSI model, thereby greatly reducing the complexity in software development of a programmer, and eliminating the need of the operator correspondingly making corresponding modifications to APs of the WLAN network.

DETAILED DESCRIPTION OF THE EMBODIMENTS

In the following, the technical solutions of the embodiments of the present invention are further described with reference to the accompanying drawings and specific embodiments.

At present, performing WLAN authentication based on a SIM card has been commonly recognized as the most ideal solution for integrating a WLAN network with a mobile communication network. However, in conventional art, this solution has not yet been widely and truly implemented. This is because that, in conventional art, although an EAP-SIM protocol has been put forward that can theoretically implement WLAN authentication with a SIM card, since this protocol is situated at a relatively lower "network layer" in the OSI seven-layer model, it will be too complex for a programmer to implement it with software, and it is also necessary for an operator to modify APs of the WLAN network. In the meantime, EAP-SIM cannot solve the problem of roaming between different WLAN networks. Therefore, on the whole, the EAP-SIM protocol is not an ideal solution for implement SIM card-based authentication for a WLAN network.

Accordingly, to overcome the aforementioned disadvantages, an embodiment of the present invention provides a webpage-based WLAN authentication method. According to the method, a WLAN gateway similar to a webpage server is added between a WLAN user terminal and an authentication server, such that the authentication of the WLAN network performed by the authentication server is implemented through a webpage, that is, the authentication of the WLAN network is implemented at the topmost "application layer" in the OSI model, thereby greatly reducing the complexity in software development work of a programmer, and eliminating the need of the operator correspondingly making corresponding modifications to the APs.

Further, the WLAN authentication method according to the embodiment of the present invention is not only applicable in the current widely-used 2G mobile communication network, but also is applicable in the 3G mobile communication network to be promoted. Since in a 3G network, the subscriber identification module used by a subscriber is no longer a SIM card but a USIM card or UIM card that is matched with the 3G network, in the embodiments of the present invention, when referring to an general name for a SIM card of a 2G network and a USIM card or a UIM card of a 3G network, the general name may be an abbreviation (U)SIM to avoid a conceptual confusion.

Figure 1:
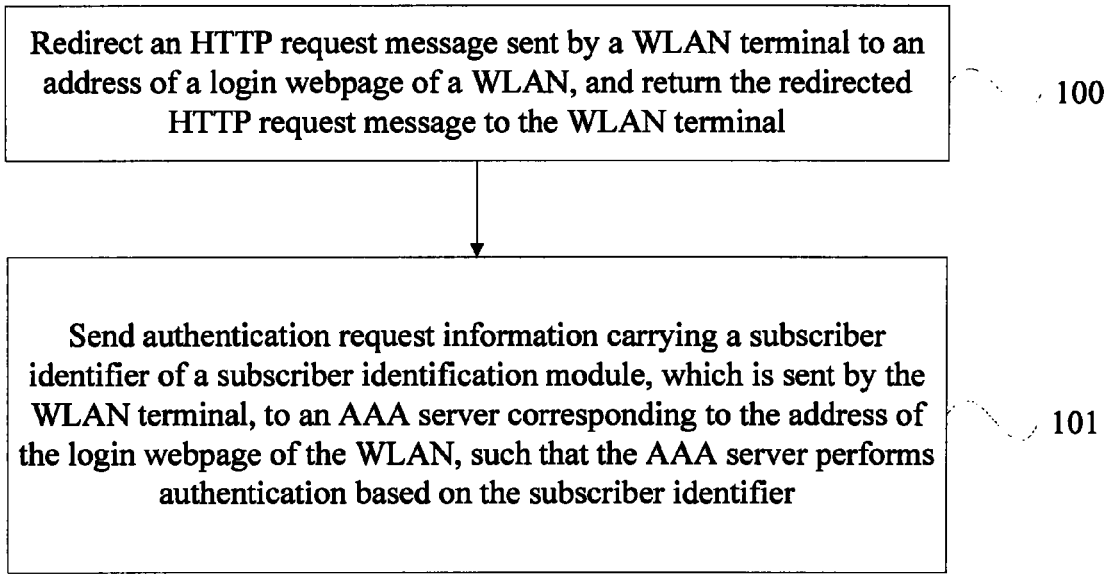
FIG. 1 is a flow chart of a WLAN authentication method according to a first embodiment of the present invention.

FIG. 1 is a flow chart of a WLAN authentication method according to a first embodiment of the present invention. As shown in FIG. 1, the method includes the following steps.

Step 100: Redirect an HTTP request message sent by a WLAN terminal to an address of a login webpage of a WLAN, and return the redirected HTTP request message to the WLAN terminal.

After accessing the WLAN network through an access point of the WLAN network, when visiting any webpage through an IE browser (not limited to visiting a webpage through a browser, also including any other internet access operations), the WLAN terminal sends an HTTP request message to an HTTP webpage server. The HTTP request message includes the address of the webpage. However, since a WLAN gateway is arranged between the WLAN terminal and the server of the WLAN network, after the WLAN terminal is connected to an AP of the WLAN network, any HTTP request message containing an address of any webpage, which is sent by the WLAN terminal, is intercepted by the WLAN gateway. The WLAN gateway is specifically an access control gateway and is equivalent to an HTTP webpage server.

After intercepting any HTTP request message sent by the WLAN terminal, the WLAN gateway first determines whether the WLAN terminal has been authenticated. If the WLAN terminal has been authenticated, the gateway forwards the HTTP request message to a server corresponding to the website. However, if the WLAN terminal has not been authenticated before visiting the webpage, the WLAN gateway redirects the operation of the WLAN terminal visiting a webpage to the operation of visiting a login webpage of the WLAN network. In particular, when the WLAN gateway verifies that the WLAN terminal sending the HTTP request message has not been authenticated, the WLAN gateway redirects the address of any webpage in the received HTTP request message to an address of the login webpage of the WLAN network, and sends a redirection message containing the address of the login webpage to the WLAN terminal, such that a subscriber of the WLAN terminal can input a subscriber identifier to be authenticated into the login webpage, or send a preset subscriber identifier to the login webpage for authentication.

Step 101: Send authentication request information carrying a subscriber identifier of a subscriber identification module, which is sent by the WLAN terminal, to an AAA server corresponding to the address of the login webpage of the WLAN, such that the AAA server performs authentication based on the subscriber identifier.

After receiving the redirection message sent by the WLAN gateway, the WLAN terminal queries whether the WLAM terminal is connected to a (U)SIM card, that is, whether the WLAN can communicate with a (U)SIM card. If it is queried that the terminal is connected to a (U)SIM card, the WLAN terminal acquires a unique identifier of the (U)SIM card, that is, an IMSI identifier, from the (U)SIM card connected to the WLAN terminal, and sends the IMSI identifier to the website of the login webpage of the WLAN network for authentication. That is to say, the authentication request information carrying the IMSI identifier, which is sent by the WLAN terminal and received by the WLAN gateway, is acquired from the (U)SIM card when the WLAN terminal detects that the WLAN terminal is connected to the (U)SIM card.

Specifically, the IMSI identifier may be an IMSI identifier of a 2G mobile communication network, that is, a unique IMSI identifier of a SIM card in a GSM network, or the IMSI identifier may be a unique IMSI identifier in a 3G mobile communication network, that is, a unique IMSI identifier of a USIM card or a UIM card of a 3G network. However, whether authentication request information carrying an IMSI identifier of a 2G network or authentication request information carrying an IMSI identifier of a 3G network is received, the WLAN gateway sends the authentication request information to an AAA server, such that the AAA server authenticates the IMSI identifier through a corresponding 2G or 3G authentication center. Therefore, in the embodiments of the present invention, besides authenticating a WLAN network account number and a password of subscribers, the AAA server can also authenticate a unique subscriber identifier of a (U)SIM card through an authentication center of a mobile communication network. Since the authentication performed on the unique IMSI identifier contained in the (U)SIM card can verify the legitimacy of the subscriber, in this embodiment, only based on the IMSI identifier can the AAA server confirm the legitimate identity of the subscriber of the WLAN terminal without performing another authentication of the account number and the password of the WLAN terminal.

In addition, in this embodiment, if the WLAN terminal is not connected to a (U)SIM card, that is, the WLAN terminal does not query that currently it can communicate with a connected (U)SIM card, the WLAN terminal sends a preset unique account number and password of a subscriber within the WLAN network to the WLAN gateway, through the login webpage redirected by the WLAN gateway. Then the WLAN gateway forwards the account number and the password to the AAA server, such that the AAA server authenticates the account number and the password.

The WLAN authentication method according to this embodiment presents to a subscriber of a WLAN terminal a webpage-based platform which uses a (U)SIM card for authentication, by adding a WLAN gateway capable of redirecting an HTTP request message, which is sent by the terminal, to a login website of the WLAN network, between the WLAN terminal and an authentication server, such that the (U)SIM-card based authentication for the WLAN network can be implemented at the topmost "application layer" in the OSI model, thereby greatly reducing the complexity of software development work of a programmer, and eliminating the need of the operator making correspondingly modifications to the APs of the WLAN network.

Figure 2:
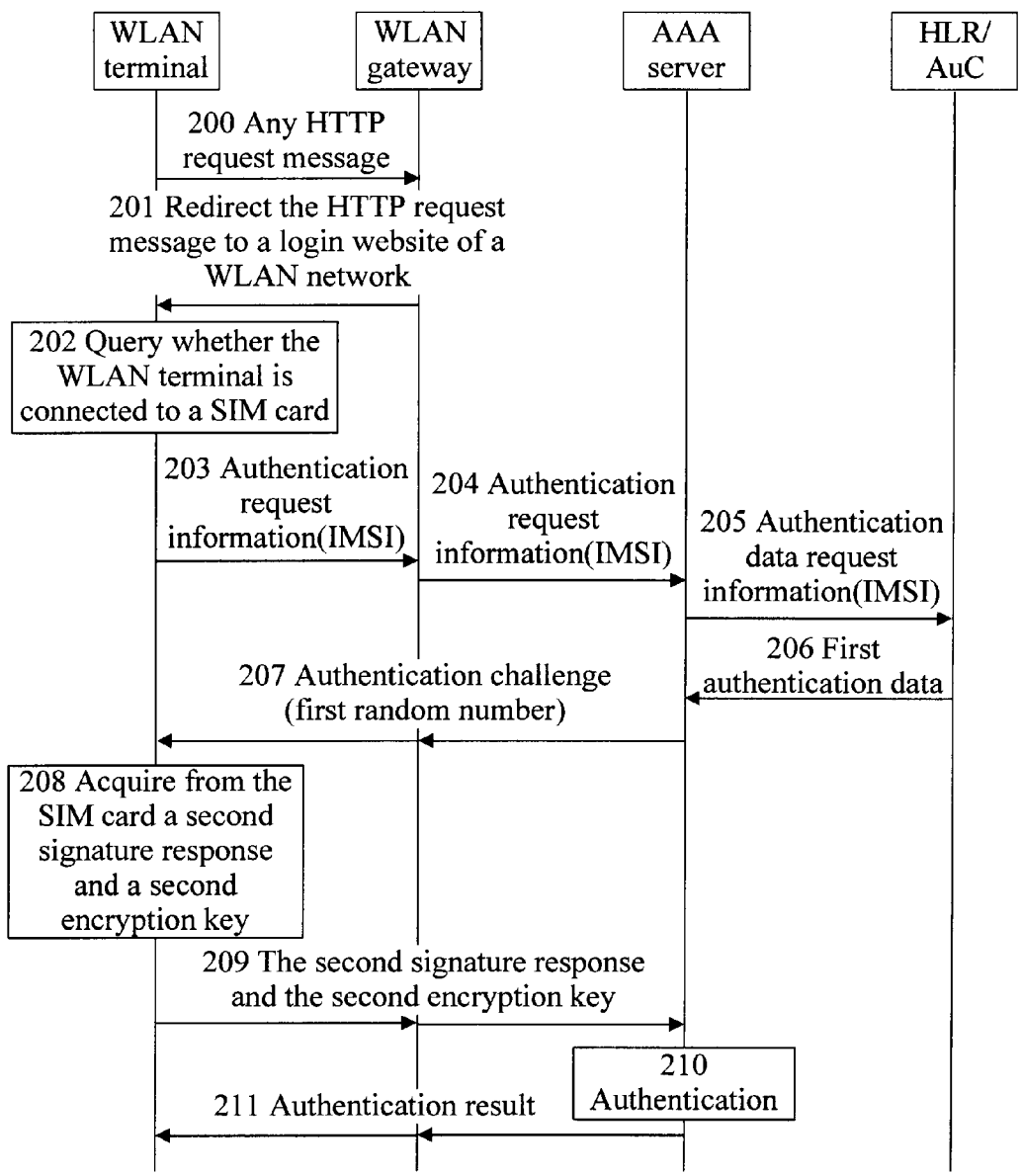
FIG. 2 is a flow chart of a WLAN authentication method according to a second embodiment of the present invention.

FIG. 2 is a flow chart of a WLAN authentication method according to a second embodiment of the present invention. This embodiment mainly provides a method of a WLAN network performing authentication using a SIM card of a 2G network. In this embodiment, an AAA server authenticates a subscriber of a WLAN terminal, based on a received IMSI identifier of a subscriber of a SIM card in the 2G network. And this authentication is implemented by the AAA server through an authentication center of the 2G network, that is, a Home Location Register/Authentication Center (HLR/AuC). As shown in FIG. 2, the method includes the following steps.

Step 200: A WLAN gateway intercepts an HTTP request message sent by a WLAN terminal, in which the HTTP message carries an address of an arbitrary webpage.

Step 201: The WLAN gateway redirects the address of the arbitrary webpage to an address of a login webpage of the WLAN network, and sends a redirection message containing the address of the login webpage of the WLAN network to the WLAN terminal.

Step 202: The WLAN terminal queries whether the WLAN terminal is connected to a SIM card. If the WLAN terminal is connected to a SIM card, the terminal acquires an IMSI identifier from the SIM card.

Specifically, after receiving the redirection message containing the address of the login webpage of the WLAN network, which is sent by the WLAN gateway, the WLAN terminal queries whether the WLAN terminal is connected to a SIM card. If the WLAN terminal is connected to a SIM card, the terminal acquires an IMSI identifier from the SIM card. In this embodiment, the IMSI identifier acquired herein is a unique identifier of each SIM subscriber in the 2G network, that is, a unique identifier of each SIM subscriber in a GSM network.

Step 203: WLAN terminal sends authentication request information carrying the IMSI identifier to the WLAN gateway.

After acquiring the IMSI identifier from the SIM card, the WLAN terminal sends authentication request information carrying the IMSI identifier to the WLAN gateway. When sending the authentication request information, the WLAN terminal may directly send the authentication request information to the WLAN gateway, or the WLAN terminal may have the authentication request information encrypted by a Secure Socket Layer (SSL) encryption algorithm ad then send the encrypted authentication request information to the WLAN gateway. Performing SSL encryption on the authentication request information and then sending the encrypted authentication request information to the WLAN gateway is to ensure the security and confidentiality of the authentication request information received by WLAN gateway. The SSL encryption algorithm is a type of algorithm dedicated to protecting the confidentiality of private information and interactive information of a logged-in subscriber. Since in the authentication process of a WLAN network, information sent from a WLAN terminal is susceptible to theft and the security level is relatively low, performing SSL encryption on authentication request information sent by a WLAN terminal and then sending the encrypted authentication request information to the WLAN gateway may improve the security level of the authentication request information and prevent the IMSI identifier contained in the authentication request information from being stolen by an illegitimate subscriber, so as to protect the safety of the server.

In addition, in this embodiment, if the WLAN terminal finds that no SIM card is currently connected, that is, the WLAN terminal currently cannot perform the SIM authentication, the WLAN terminal sends a unique account number and password of the subscriber in the WLAN network to the WLAN gateway. The WLAN gateway forwards the account number and password to an AAA server, such that the AAA server authenticates the account number and password of the subscriber. After the account number and password of the subscriber is authenticated, the authentication process of the WLAN network according to the embodiment of the present invention is ended.

Step 204: The WLAN gateway forwards the received authentication request information to the AAA server.

Specifically, if the authentication request information received by the WLAN gateway has been encrypted by the SSL encryption algorithm at the WLAN terminal, the WLAN gateway performs an SSL decryption operation corresponding to the SSL encryption algorithm on the information to reacquire the IMSI identifier and then sends the IMSI identifier to the AAA server, such that the AAA server performs identity authentication on the WLAN terminal based on the IMSI identifier.

Step 205: The AAA server sends authentication data request information carrying the IMSI identifier to the HLR/AuC.

After receiving the authentication request information containing the IMSI identifier from the WLAN gateway, the AAA server authenticates the SIM card through the HLR/AuC. First, the AAA server sends the authentication data request information to the HLR/AuC to request the HLR/AuC to return the authentication data corresponding to the IMSI identifier, in which the authentication data request information carries the IMSI identifier. For a comprehensive operator, they manage both a 2G network and a WLAN network. Therefore, it is not difficult for the AAA server in the WLAN network to conduct data communication with the HLR/AuC in the 2G network and request to and acquire from the HLR/AuC the authentication data.

Step 206: The HLR/AuC generates first authentication data based on the received IMSI identifier and sends the first authentication data to the AAA server.

The HLR/AuC stores root keys Ki of all SIM cards issued by the present operator, in which each root key Ki corresponds to a unique IMSI identifier of a SIM card, and the HLR/AuC also stores this type of correspondence. After receiving the IMSI identifier of the SIM card, the HLR/AuC can very easily query the root key Ki corresponding to the received IMSI identifier from the set of all stored root keys. In addition, in response to the authentication data request information sent by the AAA server, the HLR/AuC generates an arbitrary random number RAND, which is referred to as a first random number in this embodiment. Based on the queried root key Ki and the first random number RAND, the HLR/AuC obtains an authentication triple data corresponding to the IMSI identifier through computation by a preset GSM algorithm (such as A3/A8 algorithm). In this embodiment, the authentication triple data is referred to as first authentication data, which includes a first random number RAND, a first signature response SRES, and a first encryption key Kc. The first signature response SRES and the first encryption key Kc are respectively computed by the GSM algorithm based on the first random number RAND and a root key Ki corresponding to the IMSI identifier. After obtaining the first authentication data by computing, the HLR/AuC sends the first authentication data to the AAA server, such that the AAA server performs corresponding processing on the first authentication data.

The first authentication data is not necessarily one set of data. To make the authentication result more precise, the first authentication data may include three sets of data, that is, three different sets of first random numbers RANDs, first signature responses SRESs, and first encryption keys Kcs, in which the first signature response SRES and the first encryption key Kc of each set of first authentication data are respectively obtain through computation by the HLR/AuC by a preset GSM algorithm using the first random number RAND and a root key Ki corresponding to the IMSI identifier of that set of first authentication data.

Step 207: The AAA server sends the first random number in the first authentication data through the WLAN gateway to the WLAN terminal and initiates an authentication challenge to the WLAN terminal.

After receiving the first authentication data, the AAA server temporarily stores the first signature response SRES and the first encryption key Kc, for subsequent authentication. However, for the first random number RAND, the AAA server sends the first random number RAND through the WLAN gateway to the WLAN terminal. If the first authentication data received by the AAA server and sent by the HLR/AuC includes three sets of data, the AAA server simultaneously sends the three different first random numbers RANDs in these three sets of first authentication data through the WLAN gateway to the WLAN terminal.

Step 208: Based on the first random number, the WLAN terminal acquires a second signature response and a second encryption key corresponding to the first random number.

After receiving the first random number RAND from the WLAN gateway, the WLAN terminal sends the first random number RAND to a SIM card connected. The SIM card obtains a second signature response SRES' and a second encryption key Kc' through computation by the same GSM algorithm as that in the HLR/AuC, based on the first random number RAND and a root key Ki stored by the SIM card. For each legitimate SIM card subscriber, a unique root key Ki is stored in the SIM card, and the root key Ki has a one-to-one correspondence with the IMSI identifier of the SIM card. If the SIM card subscriber is legitimate, the root key Ki stored by the SIM card is identical with the root key Ki corresponding to the IMSI identifier of the SIM card as queried by the HLR/AuC. Further, as the SIM card also obtains the second signature response SRES' and the second encryption key Kc' through computation by the same GSM algorithm as that in the HLR/AuC, if the SIM card subscriber is legitimate, the second signature response SRES' and the second encryption key Kc' obtained through computation by the SIM card subscriber is identical with the first signature response SRES and the first encryption key Kc obtained through computation by the HLR/AuC.

Step 209: In response to the authentication challenge initiated by the AAA server, the WLAN terminal sends the second signature response and the second encryption key through the WLAN gateway to the WLAN terminal.

After acquiring the second signature response SRES' and the second encryption key Kc', the WLAN terminal sends the SRES' and the Kc' through the WLAN gateway to the AAA server. Specifically, in this embodiment, besides directly sending the SRES' and the Kc' through the WLAN gateway to the AAA server, the WLAN terminal also obtains an AT-MAC parameter through computation by a special algorithm using the SRES' and the Kc' and then sends the AT-MAC parameter through the WLAN gateway to the AAA server, so as to enhance the security level of the transmission and ensure the correctness of the authentication result.

Step 210: The AAA server compares the received second signature response and second encryption key with the temporarily stored first signature response and first encryption key, respectively. If the second signature response is identical with the first signature response and the second encryption key is identical with the first encryption key, an authentication result of authentication success is obtained. If the second signature response is not identical with the first signature response and the second encryption key is not identical with the first encryption key, an authentication result of authentication failure is obtained.

After receiving the second signature response SRES' and the second encryption key Kc', the AAA server compares the second signature response SRES' and the second encryption key Kc' with the first signature response SRES and the first encryption key Kc, respectively. If second signature response SRES' is identical with the first signature response SRES and the second encryption key Kc' is identical with the first encryption key Kc, it is indicated that the authentication data obtained through computation by the network side using the received IMSI identifier is identical with the authentication data obtained through computation by the subscriber side using the SIM card, that is, the IMSI identifier of the SIM card sent by the WLAN terminal is legitimate, that is, the subscriber of the WLAN terminal is legitimate, so the AAA server gets an authentication result of authentication success. If the second signature response SRES' is not identical with the first signature response SRES and the second encryption key Kc' is not identical with the first encryption key Kc, it is indicated that the authentication data obtained through computation by the network side using the received IMSI identifier is identical with the authentication data obtained through computation by the subscriber side using the SIM card, that is, the IMSI identifier of the SIM card sent by the WLAN terminal is not legitimate, so the AAA server gets an authentication result of authentication failure.

In addition, if the AAA server receives the AT-MAC parameter obtained through computation by a special algorithm, the AAA server performs an inverse operation corresponding to the special algorithm on the AT-MAC parameter to re-obtain the second signature response SRES' and the second encryption key Kc' through computation, and then compares the second signature response SRES' and the second encryption key Kc' with the first signature response SRES and the first encryption key Kc to get the authentication result.

Step 211: The AAA server sends the authentication result through the WLAN gateway to the WLAN terminal.

After the authentication, the AAA server sends the authentication result through the WLAN gateway to the WLAN terminal. If the authentication succeeds, the AAA server continues to perform authorization and accounting functions on the WLAN terminal, and the WLAN terminal successfully passes the authentication of the SIM card and accesses the Internet.

The WLAN authentication method according to this embodiment mainly provides an authentication method based on a SIM card of a 2G network. On one hand, by adding between the WLAN user terminal and the authentication server a WLAN gateway capable of redirecting an HTTP request message sent by the terminal to a login website of the WLAN network, a platform using the web for authentication of the SIM card is provided for the WLAN terminal, such that SIM card-based authentication for the WLAN network can be implemented at the topmost "application layer" in the OSI model, thereby greatly reducing the complexity of the development work of a programmer, and eliminating the need of the operator making corresponding modifications to the APs. On the other hand, by arranging a uniform AAA server and performing uniform authentication on a subscriber identifier of the SIM card acquired by a WLAN client, the problem of roaming between different WLAN networks is solved.

Based on the above technical solution, further, in this embodiment, the authentication request information sent by the WLAN terminal may also include a second random number RAND', in which the second random number is randomly generated by the WLAN terminal. If the authentication request information sent by the WLAN terminal includes the second random number RAND', the second random number RAND' is sent along with the IMSI identifier through the WLAN gateway to the AAA server, and is sent along with the IMSI identifier to the HLR/AuC, such that the HLR/AuC obtains a third signature response and a third encryption key through computation by a preset GSM algorithm, based on the second random number RAND' and a root key Ki corresponding to the IMSI identifier, and sends the third signature response and the third encryption key along with the first authentication data to the AAA server. And after receiving the third signature response and the third encryption key, the AAA server sends the third signature response and the third encryption key through the WLAN gateway to the WLAN terminal.

As such, the WLAN terminal sends the second random number generated by the SIM card along with the IMSI identifier to the AAA server, such that the AAA server can request to acquire authentication data corresponding to the second random number from the HLR/AuC based on the second random number, and the WLAN terminal can check the authentication data and complete "authentication" of the identity of the network side by the subscriber side. Specifically, prior to obtaining the second signature response and the second encryption key through computation based on the first random number and a root key Ki of the SIM card, the SIM card connected to the WLAN terminal checks the received third signature response and the third encryption key, that is, based on the second random number obtained from the WLAN terminal and a root key of the SIM card, by the same GSM algorithm as that in the HLR/AuC, obtains another set of signature response and encryption key through computation, and compares the signature response and encryption key with the third signature response and the third encryption key, thereby authenticating the identity of the server of the network side. This step is executed before the WLAN terminal sends the second signature and the second encryption key. Only the authentication of the network by the terminal succeeds, will the second signature response and the second encryption key be computed and sent through the WLAN gateway to the AAA server. If the authentication of the network by the terminal does not succeed, the WLAN terminal considers the authentication challenge initiated by the AAA server to be an attack from a vicious website, ends this authentication process, and ceases the subsequent operations.

By adding the client checking a parameter sent from the network side to the authentication process, the technical solution of this embodiment enables the WLAN terminal to perform a corresponding identity authentication on the AAA server of the network side, thereby further improving the security of the authentication process, and effectively avoiding an attack on the client from an vicious website.

Figure 3:
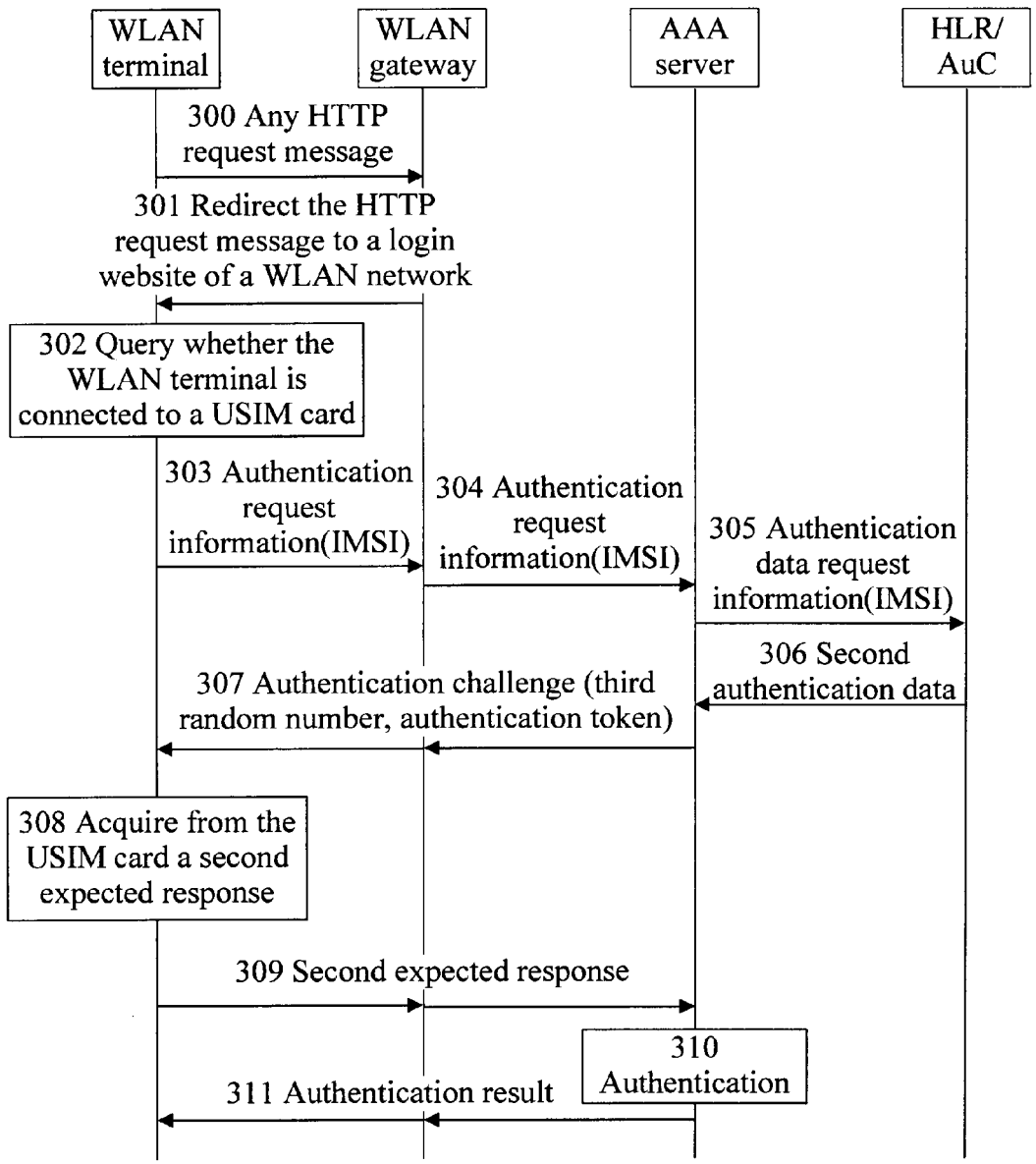
FIG. 3 is a flow chart of a WLAN authentication method according to a third embodiment of the present invention.

FIG. 3 is a flow chart of a WLAN authentication method according to a third embodiment of the present invention. This embodiment mainly provides a method of a WLAN network using a SIM card in a 3G network for authentication. In this embodiment, an AAA server authenticates a subscriber of a WLAN terminal based on a received IMSI identifier of a 3G network USIM card or UIM subscriber. This authentication process is implemented by the AAA server using an authentication center of the 3G network, that is, a Home Environment/Home Location Register (HE/HLR). In addition, in the 3G network, the subscriber identification module used by the subscriber side is a USIM card or a UIM card, depending on the different networks provided by different operators. Regardless of a USIM card or a UIM card, the basic principle and function is similar. Therefore, in this embodiment, only the USIM card is taken as an example for description, and the UIM card-based authentication method for the WLAN network also falls within the protection scope of the embodiments of the present invention. As shown in FIG. 3, the method of this embodiment includes the following steps.

Step 300: The WLAN gateway intercepts any HTTP request message sent by the WLAN terminal, in which the HTTP message carries an address of any webpage.

Step 301, the WLAN gateway redirects the address of the any webpage to an address of a login webpage of the WLAN network, and sends a redirection message containing the address of the login webpage to the WLAN terminal.

Step 302, the WLAN terminal determines whether the WLAN terminal is connected to a USIM card, and if the WLAN is connected to a USIM card connected, the WLAN terminal acquires an IMSI identifier from the USIM card.

Step 303, the WLAN terminal sends authentication request information carrying the IMSI identifier to the WLAN gateway.

The above four steps are similar to the steps in the second embodiment. The only difference lies in that, in this embodiment, the IMSI identifier acquired by the WLAN terminal from the USIM card is a unique identifier of each USIM subscriber in the 3G network. When the WLAN terminal sends the authentication request information carrying the IMSI identifier, likewise, when the WLAN terminal sends the authentication request information carrying the IMSI identifier in the 3G network, the WLAN terminal may directly send authentication request information to the WLAN gateway, or perform encryption on the authentication request information by an SSL encryption algorithm and then send the encrypted authentication request information to the WLAN gateway. Performing SSL encryption on the authentication request information and then sending the encrypted authentication request information to the WLAN gateway is also to ensure the security and confidentiality of the authentication request information received by the WLAN gateway.

In addition, the same as the second embodiment, if the WLAN terminal finds that currently no USIM card is connected (that is, currently the condition for USIM authentication is not satisfied), the WLAN terminal sends the unique account number and password of the subscriber of the WLAN terminal in the WLAN network to the WLAN gateway, such that the WLAN gateway forwards the account number and password to an AAA server, and the AAA server authenticates the account number and password of the subscriber.

Step 304: The WLAN gateway forwards the received authentication request information to the AAA server.

Specifically, if the authentication request information received by the WLAN gateway is information encrypted by the SSL encryption algorithm, the WLAN gateway performs an SSL decryption operation corresponding to the SSL encryption algorithm on the information and re-obtains the IMSI identifier, then sends the IMSI identifier to the AAA server, such that the AAA server authenticates the IMSI identifier.

Step 305: The AAA server sends authentication data request information carrying the IMSI identifier to the HE/HLR.

After receiving the authentication request information containing the IMSI identifier from the WLAN gateway, the AAA server authenticates the USIM card through an authentication center of the 3G network, that is, the HE/HLR. First, the AAA server sends the authentication data request information to the HE/HLR of the 3G network to request the HE/HLR to return authentication data corresponding to the IMSI identifier, in which the authentication data request information carries the IMSI identifier. For a comprehensive operator, they manage both a 3G network and a WLAN network. Therefore, it is not difficult for the AAA server in the WLAN network to conduct data communication with the HE/HLR in the 3G network, and requests and acquire the authentication data from the HE/HLR.

Step 306: The HE/HLR generates second authentication data based on the received IMSI identifier and sends the IMSI identifier to the AAA server.

The HE/HLR stores the root keys Kis of all USIM cards issued by the present operator. Each root key Ki has a one-to-one correspondence with the unique IMSI identifier of a USIM card, and the HE/HLR also stores this type of correspondence. After receiving the IMSI identifier of the USIM card, the HE/HLR can very easily query the root key Ki corresponding to the received IMSI identifier from the set of all root keys stored. In addition, in response to the authentication data request information sent by the AAA server, the HE/HLR generates an arbitrary random number, which in this embodiment is referred to as a third random number. Based on the queried root key Ki and the third random number, the HE/HLR obtains authentication quintuple data corresponding to the received IMSI identifier through computation by a preset algorithm. In this embodiment, the authentication quintuple data is referred to as second authentication data. The second authentication data includes a third random number RAND", a first expected response XRES, a first key CK, a first integrity key IK, and a first authentication token AUTN. The first expected response XRES, the first key CK, the first integrity key IK, and the first authentication token AUTN are all obtained through computation respectively by a preset algorithm, based on the third random number RAND" and the root key Ki corresponding to the IMSI identifier. In this embodiment, the preset algorithm is referred to as a 3G algorithm (3G User Authentication). After obtaining the second authentication data through computation, the HE/HLR sends the second authentication data to the AAA server, and the AAA server performs corresponding processing on the second authentication data.

The second authentication data is not necessarily one set of data. To make the authentication result more precise, the second authentication data may include multiple sets of data, that is, include multiple sets of different third random numbers RAND", first expected responses XRES, first keys CK, first integrity keys IK, and first authentication tokens AUTN. The first expected response XRES, the first key CK, the first integrity key IK, and the first authentication token AUTN in each set of second authentication data are all obtained through computation by a preset 3G algorithm by the HE/HLR based on the automatically generated third random number RAND" and root key Ki corresponding to the IMSI identifier.

Step 307: The AAA server sends the third random number and the authentication token in the second authentication data through the WLAN gateway to the WLAN terminal, and initiates an authentication challenge to the WLAN terminal.

After receiving the second authentication data, the AAA server temporarily stores the first expected response XRES for subsequent authentication. For the third random number RAND" and the authentication token AUTN, the AAA server sends them through the WLAN gateway to the WLAN terminal. Here, the authentication token is used for the WLAN terminal to authenticate the AAA server, that is, in the SIM card authentication process of the 3G network, the authentication quintuple data not only includes the parameters for the authentication of the client by the network side, but also includes the parameters for the authentication of the network side by the client. The purpose of setting the parameters for the authentication of the network side by the client is to enable the client to identify and authenticate the identity of the server at the network side, and prevent the client from being attacked by vicious websites.

In addition, in the authentication method of this embodiment, the difference from the way of the WLAN performing the authentication using a SIM card of 2G network is that, if the AAA server receives multiple sets of second authentication data sent by the HE//HLR, the AAA server chooses an arbitrary set of second authentication data from the multiple sets of second authentication data, and send the third random number RAND" and the authentication token AUTN through the WLAN gateway to the WLAN terminal. That is, regardless of how many sets of second authentication data is received by the AAA server, only one set of second authentication data is chosen for authentication and verification.

Step 308: The WLAN terminal authenticates the AAA server based on the first authentication token. If the authentication succeeds, the WLAN terminal acquires from the USIM card a second expected response RES based on the third random number.

After receiving the third random number RAND and the authentication token AUTN from the WLAN gateway, the WLAN terminal sends the third random number RAND and the authentication token AUTN to the USIM card connected. The USIM card first authenticates the AAA server at the network side based on the third random number RAND" and the first authentication token AUTN. Here, the process for authenticating the first authentication token AUTN is as follows. The USIM card obtains a second authentication token AUTN' through computation by the same 3G algorithm as that in the HE/HLR, based on the third random number RAND" and the root key of the USIM card, and compares the second authentication token AUTN' with the first authentication token AUTN as obtained by the HE/HLR through computation. If the second authentication token AUTN' is identical with the first authentication token AUTN, it is verified that the AAA server initiating the authentication challenge is a legitimate authentication server; and if the second authentication token AUTN' is not identical with the first authentication token AUTN, the WLAN terminal considers the authentication challenge initiated by the AAA server is an attack from a vicious website and ends the present authentication process, and ceases the subsequent operations.

Based on the first authentication token AUTN, the USIM card completes the authentication of the network side. After the authentication succeeds, the USIM card obtains a second expected response RES through computation by the same 3G algorithm as that in the HE/HLR, based on the third random number RAND" and the root key stored by the USIM card, and sends the RES to the WLAN terminal.

Step 309: In response to the authentication challenge initiated by the AAA server, the WLAN terminal sends the second expected response RES through the WLAN gateway to the AAA server.

Specifically, after acquiring the second expected response RES from the SIM card, the WLAN terminal sends the RES through the WLAN gateway to the AAA server, and the AAA server detects the RES.

Step 310: The AAA server compares the received second expected response with the first expected response. If the received second expected response is identical with the first expected response, an authentication result of authentication success is obtained. If the received second expected response is not identical with the first expected response, an authentication result of authentication failure is obtained.

After receiving the second expected response RES, the AAA server compares the second expected response RES with the first expected response XRES. If the second expected response RES is identical with the first expected response) (RES, it is indicated that the IMSI identifier sent by the WLAN terminal is legitimate and the authentication data obtained by the network side through computation using the received IMSI identifier is identical with the authentication data obtained by the subscriber side through computation using the USIM card, the AAA server gets an authentication result of "passed". If the second expected response RES is not identical with the first expected response XRES, it is indicated that the IMSI identifier sent by the WLAN terminal is not legitimate and the authentication data obtained by the network side through computation using the received IMSI identifier is not identical with the authentication data obtained by the subscriber side through computation using the USIM card, the AAA server obtains an authentication result of authentication failure.

Step 311: The AAA server sends the authentication result through the WLAN gateway to the WLAN terminal.

After completing the authentication, the AAA server sends the authentication result through the WLAN gateway to the WLAN terminal. If the authentication succeeds, the AAA server continues to perform the authorization and accounting functions on the WLAN terminal, and the WLAN terminal successfully passes through the authentication of the USIM card and accesses the Internet.

The WLAN authentication method according to this embodiment mainly provides an authentication method based on a USIM card of a 3G network. On one hand, by adding between the WLAN terminal and the authentication server a WLAN gateway, a webpage-based platform for authentication of a subscriber identification module of a 3G network is provided for the WLAN terminal, such that USIM card- or UIM card-based authentication for the WLAN network can be implemented at the topmost "application layer" in the OSI model, thereby greatly reducing the complexity of the development work of a programmer, and eliminating the need of the operator making corresponding modifications to the APs. Further, by providing an AAA server uniformly arranged and performing uniform authentication on a subscriber identifier of the SIM card obtained by the WLAN subscriber, the problem of roaming between different WLAN networks is solved.

Persons of ordinary skill in the art can understand that, all or part of steps for implementing the above method embodiments can be executed by a program instructing relevant hardware. The program may be stored in a computer readable storage medium. When executed, the program will implement the steps including the above method embodiments. The storage medium includes a Read-only Memory (ROM), a Random-access Memory (RAM), a magnetic disk, an optical disk, or any medium capable of storing program codes.

Figure 4:
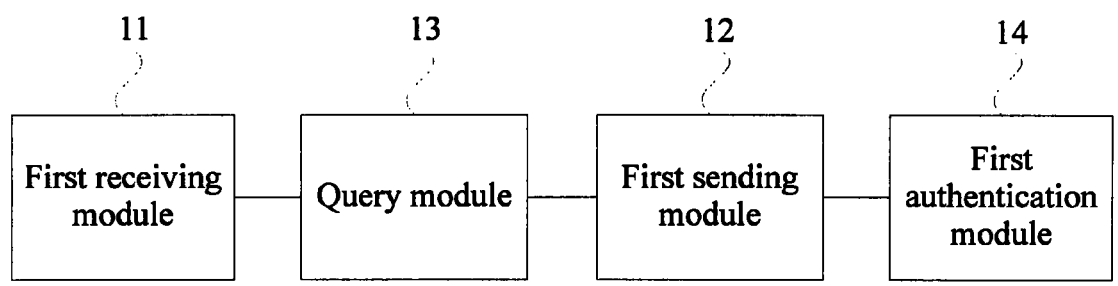
FIG. 4 is a schematic structure diagram of a WLAN terminal according to a fourth embodiment of the present invention.

FIG. 4 is a schematic structure diagram of a WLAN terminal according to a fourth embodiment of the present invention. As shown in FIG. 4, the WLAN terminal of this embodiment includes:

a first receiving module 11, configured to receive a redirection message containing an address of the login webpage of a WLAN network sent by a WLAN gateway; and a first sending module 12, configured to send authentication request information carrying an IMSI identifier of an subscriber identification module to the address of the login webpage of the WLAN network, such that an AAA server corresponding to the address of the login webpage of the WLAN network performs authentication based on the IMSI identifier.

Further, the WLAN terminal of this embodiment also may include a query module 13, configured to query whether the WLAN terminal is currently connected to a (U)SIM card. If the WLAN terminal is connected to a (U)SIM card, the authentication request information carrying the IMSI identifier of the (U)SIM card to the address of the login webpage of the WLAN network. If the WLAN terminal is not connected to a (U)SIM card, the authentication request information carrying the subscriber identify of the WLAN network is sent to the address of the login webpage of the WLAN network. The first sending module 12 is specifically configured to send the authentication request information carrying the IMSI identifier when the query module 13 queries that the WLAN terminal is currently connected to a (U)SIM card.

By sending a subscriber identifier of a subscriber identification module connected to the WLAN terminal to the address of the login webpage of the WLAN network, the WLAN terminal according to this embodiment enables the subscriber of the WLAN terminal to perform authentication of the (U)SIM card through the webpage, such that the authentication of the (U)SIM card for the WLAN network can be implemented at the topmost "application layer" in the OSI model, thereby greatly reducing the complexity of the software development work of a programmer, and eliminating the need of an operator making corresponding modifications to the APs of the WLAN network.

Based on the above technical solution, further, this embodiment may include: a first authentication module 14, configured to authenticate the AAA server, when the authentication request information further includes a second random number, based on a third signature response corresponding to the second random number and returned by the AAA server and a third encryption key, and if the authentication succeeds, send a second signature response and a second encryption key to the WLAN gateway. The first authentication module 14 is mainly applied in an authentication method based on a SIM card of a 2G network. Since in authenticating the SIM card of the 2G network, the function of authenticating the network side by the client is absent, a second authentication module is arranged in the WLAN terminal, and a second random number is added to the authentication request information sent by the WLAN terminal, such that the client has the function of authenticating the network side in the SIM card-based WLAN authentication of this embodiment, when the SIM card is a SIM card of a 2G network.

By adding in the authentication process the client checking the parameters sent from the network side, the above technical solution of this embodiment enables the WLAN terminal to perform corresponding identity authentication of the AAA server at the network side, thereby further improving the security of the authentication process, and effectively avoiding the attacks of a vicious website on the client.

Figure 5:
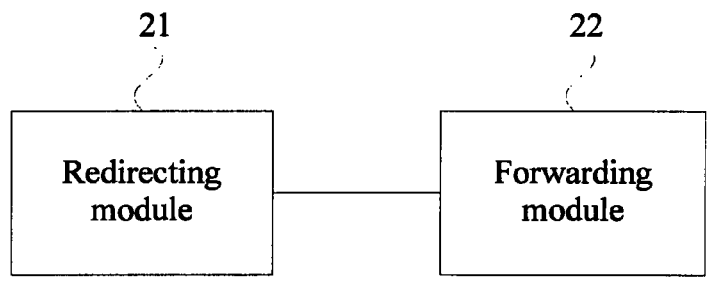
FIG. 5 is a schematic structure diagram of a server of a WLAN gateway according to a fifth embodiment of the present invention.

FIG. 5 is a schematic structure diagram of a server of a WLAN gateway according to a fifth embodiment of the present invention. As shown in FIG. 5, the server of the WLAN gateway of this embodiment includes:

a redirecting module 21, configured to redirect an HTTP request message of a WLAN terminal to a redirection message containing an address of a login webpage of a WLAN network and returning the redirection message to the WLAN terminal; and a forwarding module 22, configured to send authentication request information carrying an IMSI identifier of a subscriber identification module, which is sent by the WLAN terminal, to an AAA server corresponding to the address of the login webpage of the WLAN network, such that the AAA server authenticates the WLAN terminal based on the IMSI identifier.

This embodiment provides a server of a WLAN gateway, arranged at the side of the WLAN gateway. A webpage-based platform for authenticating the (U)SIM card is provided for the subscriber of the WLAN terminal by redirecting between the WLAN terminal and the authentication server an interne access request message to a login website of the WLAN network, such that the (U)SIM card authentication for the WLAN network can be implemented at the topmost "application layer" in the OSI model, thereby greatly reducing the complexity in the software development work of a programmer, and eliminating the need of the operator making corresponding modifications to the APs of the WLAN network.

Based on the above technical solution of this embodiment, further, when the authentication request information sent by the WLAN terminal is authentication request information encrypted by SSL encryption, the forwarding module 22 is also configured to perform operations of a decryption algorithm corresponding to the SSL encryption algorithm on the authentication request information and send the decrypted authentication request information to the AAA server. Since in the authentication of the WLAN network, information sent from the WLAN terminal is susceptible to theft and has the lowest security level, performing SSL encryption on the authentication request information sent by the WLAN terminal and then sending the encrypted authentication request information to the WLAN gateway can improve the security of the authentication request information, and prevent the IMSI identifier contained in the authentication request information from being stolen by a illegitimate subscriber, thereby protecting the safety of the server.

Figure 6:
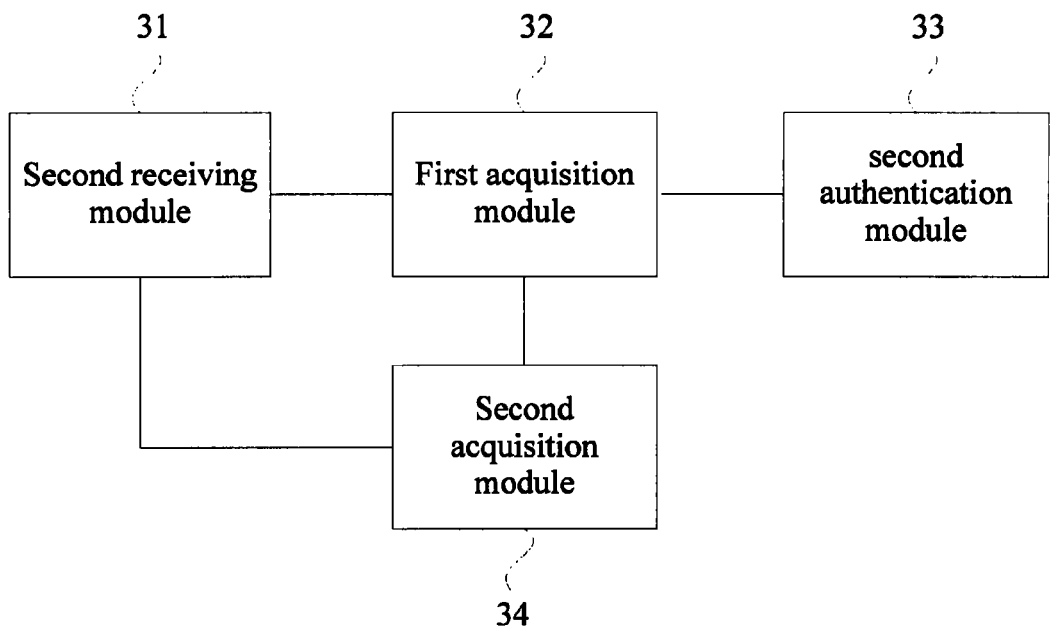
FIG. 6 is a schematic structure diagram of an AAA server according to a sixth embodiment of the present invention.

FIG. 6 is a schematic structure diagram of an AAA server according to a sixth embodiment of the present invention. As shown in FIG. 6, the AAA server of this embodiment includes:

a second receiving module 31, configured to receive authentication request information carrying an IMSI identifier (subscriber identifier) of a SIM card of a 2G network, which is sent by a WLAN gateway;

a first acquisition module 32, configured to acquire first authentication data from a 3G mobile network authentication center based on the IMSI identifier, in which the first authentication data includes a first random number, a first signature response, and a first encryption key, and acquire through the WLAN gateway a second signature response and a second encryption key from the WLAN terminal based on the first random number; and a second authentication module 33, configured to authenticate the WLAN terminal based on the first signature response, the first encryption key, and the second signature response, and the second encryption key, if the first signature response is identical with the second signature response and the first encryption key is identical with the second encryption key, send an authentication result of authentication success through the WLAN gateway to the WLAN terminal, and if the first signature response is not identical with the second signature response and the first encryption key is not identical with the second encryption key, send an authentication result of authentication failure through the WLAN gateway to the WLAN terminal.

The AAA server according to this embodiment mainly provides an AAA server capable of performing communication interactions with a 2G network authentication center. By authenticating the authentication request information carrying the IMSI identifier of the SIM card of the 2G network, which is sent by the WLAN terminal to an address of a login webpage of the WLAN network, a web-based platform for authenticating a SIM card is provided for a subscriber of a WLAN terminal, such that the SIM card authentication for the WLAN network can be implemented at the topmost "application layer" in the OSI model, thereby greatly reducing the complexity of the software development work of a programmer, and eliminating the need of the operator making corresponding modifications to the APs of the WLAN network.

Based on the above technical solution of this embodiment, further, if the authentication request information sent by the WLAN terminal further includes a second random number, the AAA server may also include a second acquisition module 34, configured to request and acquire from the 2G network authentication center a third signature response corresponding to the second random number and a third encryption key, send through the WLAN gateway to the WLAN terminal, and receive the second signature response and the second encryption key sent by the WLAN terminal through the WLAN gateway after the authentication of the terminal succeeds.

By adding in the authentication process the client checking the parameters sent from the network side, the above technical solution of the embodiment enables the WLAN terminal to perform a corresponding identity authentication on the AAA server at the network side, thereby further improving the security of the authentication process and effectively avoiding the attacks of a vicious website on the client.

Figure 7:
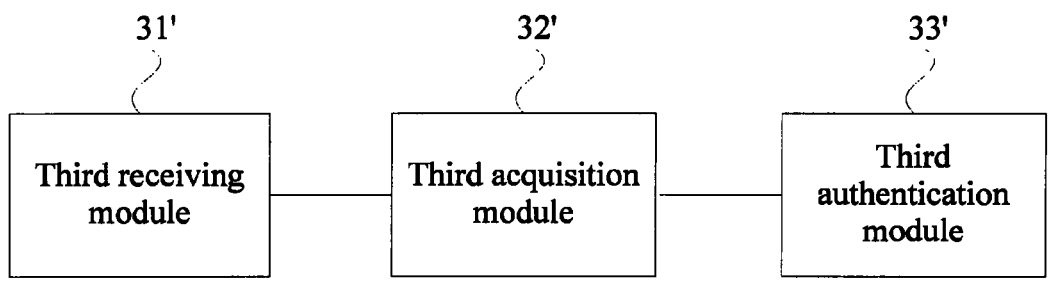
FIG. 7 is a schematic structure diagram of an AAA server according to a seventh embodiment of the present invention.

FIG. 7 is a schematic structure diagram of an AAA server according to a seventh embodiment of the present invention. In this embodiment, only authentication of a USIM card in a 3G network is taken as an example for description. However, an AAA server authenticating a UIM card also falls within the protection scope of the embodiment of the present invention. As shown in FIG. 7, the AAA server of this embodiment includes:

a third receiving module 31', configured to receive authentication request information carrying an IMSI identifier of a USIM card of a 3G network, which is sent by the WLAN gateway;

a third acquisition module 32', configured to acquire second authentication data from a 3G network authentication center, based on the IMSI identifier, in which the second authentication data includes a third random number, a first expected response, a first key, a first integrity key, and an authentication token, and acquire through the WLAN gateway a second expected response from the WLAN terminal, based on the third random number and the authentication token; and a third authentication module 33', configured to authenticate the WLAN terminal based on the first expected response and the second expected response, if the first expected response is identical with the second expected response, send an authentication result of authentication success through the WLAN gateway to the WLAN terminal, and if the first expected response is not identical with the second expected response, send an authentication result of authentication failure through the WLAN gateway to the WLAN terminal.

This embodiment provides an AAA server capable of performing communication interactions with a 3G network authentication center. By authenticating the authentication request information carrying the IMSI identifier of the USIM card or the UIM card of the 3G network, which is sent by the WLAN terminal to an address of a login webpage of the WLAN network, a web-based platform for authenticating a USIM card or a UIM card is provided a subscriber of a WLAN terminal, such that the subscriber identification module-based authentication for the WLAN network can be implemented at the topmost "application layer" in the OSI model, thereby greatly reducing the complexity of the software development work of a programmer, and eliminating the need of the operator making corresponding modifications to the APs of the WLAN network.

Figure 8:
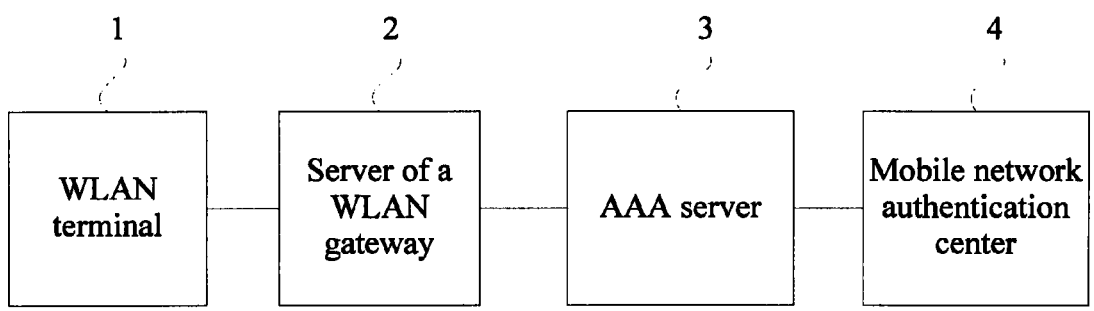
FIG. 8 is a schematic structure diagram of a WLAN authentication system according to an eighth embodiment of the present invention.

FIG. 8 is a schematic structure diagram of a WLAN authentication system according to an eighth embodiment of the present invention. As shown in FIG. 8, the WLAN authentication system of this embodiment includes a WLAN terminal 1, a server of a WLAN gateway, an AAA server 3, and a mobile network authentication center 4.

Specifically, the WLAN terminal 1 is a WLAN terminal as described in the fourth embodiment. The server 2 of the WLAN gateway is a server of a WLAN gateway as described in the fifth embodiment, and is arranged at the side of the WLAN gateway. The AAA server 3 is an AAA server as described in the sixth embodiment or seventh embodiment, that is, the AAA server 3 may be an AAA server for an authentication method based on a SIM card of a 2G network, or an AAA server for an authentication method based on a (U)SIM card of a 3G network. In this embodiment, when the AAA server is an AAA server for an authentication method based on a SIM card of a 2G network, the mobile network authentication center 4 is a 2G mobile network authentication center, that is, a HLR/AuC. When the AAA server is an AAA server for an authentication method based on a (U)SIM card of a 3G network, the mobile network authentication center 4 is a 3G mobile network authentication center, that is, a HE/HLR.

By providing a WLAN gateway between a WLAN terminal and an authentication server, the WLAN authentication system of present embodiment provides a web-based platform for authenticating a (U)SIM card for a subscriber of a WLAN terminal, in which the WLAN gateway is provided with a server capable of redirecting an internet access request message sent by the terminal to an login website of the WLAN network, such that the (U)SIM card authentication for the WLAN network can be implemented at the topmost "application layer" in the OSI model, thereby greatly reducing the complexity of the software development work of a programmer, and eliminating the need of the operator making corresponding modifications to the APs of the WLAN network.

Finally, it should be noted that, the above embodiments are merely used for illustrating, but not for limiting the technical solution of this embodiment. Although the present invention has been describe in detail by referring to the embodiments, persons of ordinary skill in the art should understand that, modifications to the technical solutions as recited in the embodiments, or equivalent replacements of part of technical features thereof are still possible. Among other things, these modifications or replacements will not cause the nature of corresponding technical solutions to depart from the protection scopes of the technical solutions of various embodiments of the present invention.

What is claimed is:

1. A wireless local area network (WLAN) authentication method, comprising:
  redirecting, by a WLAN gateway, a Hypertext Transmission Protocol (HTTP) request message sent by a WLAN terminal to an address of a login webpage of a WLAN, and returning the redirected HTTP request message to the WLAN terminal, wherein the WLAN gateway is arranged between the WLAN terminal and an Authentication/Authorization/Accounting (AAA) server of the WLAN; and
  sending, by the WLAN gateway, authentication request information carrying a subscriber identifier of a subscriber identification module sent by the WLAN terminal to the AAA server corresponding to the address of the login webpage of the WLAN such that the AAA server performs authentication based on the subscriber identifier, wherein the subscriber identifier is acquired by the WLAN terminal from the subscriber identification module when it is detected that the subscriber identity module is currently connected,
  wherein sending the authentication request information to the AAA server corresponding to the login webpage of the WLAN comprises:
    sending the authentication request information to the AAA server such that the AAA server requests and acquires from a third generation (3G) mobile network authentication center second authentication data corresponding to the subscriber identifier based on the subscriber identifier, wherein the second authentication data comprises a random number, a first expected response, a first key, a first integrity key and an authentication token;
    forwarding the random number and the authentication token sent by the AAA server to the WLAN such that the WLAN authenticates the authentication token through the subscriber identification module and acquires, based on the random number from the subscriber identification module, a second expected response corresponding to the random number after the authentication succeeds;
    forwarding the second expected response sent by the WLAN terminal to the AAA server such that the AAA server compares the second expected response with the first expected response, wherein an authentication result of authentication success is obtained when the second expected response is identical to the first expected response, and wherein an authentication result of authentication failure is obtained when the second expected response is not identical to the first expected response; and
    forwarding the authentication result sent by the AAA server to the WLAN terminal.

2. The WLAN authentication method according to claim 1, wherein before sending the authentication request information to the AAA server, the method further comprises subjecting the authentication request information to operations of a decryption algorithm corresponding to a secure sockets layer (SSL) encryption algorithm when the authentication request information comprises authentication request information obtained through computation by the WLAN terminal using the SSL encryption algorithm.

3. The WLAN authentication method according to claim 1, wherein the subscriber identification module comprises a universal subscriber identity module (USIM) card.

4. The WLAN authentication method according to claim 1, wherein the subscriber identification module comprises a user identity module (UIM) card.

5. The WLAN authentication method according to claim 1, wherein the subscriber identifier comprises an International Mobile Subscriber Identity (IMSI) identifier.

6. The WLAN authentication method according to claim 1, further comprising forwarding a preset account number and a password to the AAA server when it is detected that the subscriber identity module is not currently connected.

7. The WLAN authentication method according to claim 1, wherein the 3G mobile network authentication center comprises a Home Environment/Home Location Register (HE/HLR).

8. The WLAN authentication method according to claim 1, wherein the first expected response, the first key, the first integrity key, and the authentication token are generated based at least in part on a preset 3G algorithm and the random number.

9. The WLAN authentication method according to claim 1, wherein the authentication is performed at an application layer of an Open Systems Interconnection (OSI) model.

10. A wireless local area network (WLAN) authentication method, comprising:
  redirecting, by a WLAN gateway, a Hypertext Transmission Protocol (HTTP) request message sent by a WLAN terminal to an address of a login webpage of a WLAN, and returning the redirected HTTP request message to the WLAN terminal, wherein the WLAN gateway is arranged between the WLAN terminal and an Authentication/Authorization/Accounting (AAA) server of the WLAN; and sending, by the WLAN gateway, authentication request information carrying a subscriber identifier of a subscriber identification module sent by the WLAN terminal, to the AAA server corresponding to the address of the login webpage of the WLAN such that the AAA server performs authentication based on the subscriber identifier, wherein the subscriber identifier is acquired by the WLAN terminal from the subscriber identification module when it is detected that the subscriber identity module is currently connected, wherein sending the authentication request information to the AAA server corresponding to the login webpage of the WLAN comprises:

sending the authentication request information to the AAA server such that the AAA server requests and acquires from a second generation (2G) mobile network authentication center first authentication data corresponding to the subscriber identifier based on the subscriber identifier, wherein the first authentication data comprises a first random number, a first signature response, and a first encryption key;

forwarding the first random number sent by the AAA server to the WLAN terminal such that the WLAN terminal acquires from the subscriber identification module a second signature response and a second encryption key corresponding to the first random number based on the first random number;

forwarding the second signature response and the second encryption key sent by the WLAN terminal to the AAA server such that the AAA server compares the second signature response and the second encryption key with the first signature response and the first encryption key, respectively, wherein an authentication result of authentication success is obtained when the second signature response is identical to the first signature response and the second encryption key is identical to the first encryption key, and wherein an authentication result of authentication failure is obtained when the second signature response is not identical to the first signature response and the second encryption key is not identical to the first encryption key; and forwarding the authentication result sent by the AAA server to the WLAN terminal.

11. The WLAN authentication method according to claim 10, wherein before forwarding the second signature response and the second encryption key sent by the WLAN terminal to the AAA server, the method further comprises:

requesting and acquiring from the 2G mobile network authentication center a third signature response and a third encryption key corresponding to the second random number based on the subscriber identifier and the second random number when the authentication request information further comprises a second random number;

forwarding the third signature response and the third encryption key sent by the AAA server to the WLAN terminal such that the WLAN terminal authenticates the AAA server through the subscriber identification module based on the second random number, the third signature response, and the third encryption key; and receiving the second signature response and the second encryption key sent by the WLAN terminal when the authentication succeeds.

12. The WLAN authentication method according to claim 10, wherein before sending the authentication request information to the AAA server, the method further comprises subjecting the authentication request information to operations of a decryption algorithm corresponding to a secure sockets layer (SSL) encryption algorithm when the authentication request information comprises authentication request information obtained through computation by the WLAN terminal using the SSL encryption algorithm.

13. The WLAN authentication method according to claim 12, wherein before forwarding the second signature response and the second encryption key sent by the WLAN terminal to the AAA server, the method further comprises:

requesting and acquiring from the 2G mobile network authentication center a third signature response and a third encryption key corresponding to the second random number based on the subscriber identifier and the second random number when the authentication request information further comprises a second random number;

forwarding the third signature response and the third encryption key sent by the AAA server to the WLAN terminal such that the WLAN terminal authenticates the AAA server through the subscriber identification module based on the second random number, the third signature response, and the third encryption key; and receiving the second signature response and the second encryption key sent by the WLAN terminal when the authentication succeeds.

14. The WLAN authentication method according to claim 10, wherein the subscriber identification module comprises a subscriber identification module (SIM) card of a 2G network.

15. The WLAN authentication method according to claim 10, wherein the subscriber identifier comprises an International Mobile Subscriber Identity (IMSI) identifier of a Global System for Mobile Communications (GSM) network.

16. The WLAN authentication method according to claim 10, wherein the authentication is performed at an application layer in an Open Systems Interconnection (OSI) model.

17. The WLAN authentication method according to claim 10, further comprising forwarding a preset account number and a password to the AAA server when it is detected that the subscriber identity module is not currently connected.

18. The WLAN authentication method according to claim 10, wherein the 2G mobile network authentication center comprises a Home Environment/Home Location Register (HE/HLR).

19. The WLAN authentication method according to claim 10, wherein the first random number is generated based at least in part on a preset Global System for Mobile Communications (GSM) algorithm.

20. The WLAN authentication method according to claim 10, wherein the first authentication data comprises multiple sets of data.

* * * * *

UNITED STATES PATENT AND TRADEMARK OFFICE
CERTIFICATE OF CORRECTION

PATENT NO.        : 8,589,675 B2                                                Page 1 of 1
APPLICATION NO.   : 13/368701
DATED             : November 19, 2013
INVENTOR(S)       : Zhen Zhong It is certified that error appears in the above-identified patent and that said Letters Patent is hereby corrected as shown below:

Title Page 2, References Cited, under Other Publications, the following cited art should read:

Extended European Search Report dated (mailed) Apr. 23, 2012, issued in related Application No. 10807869.2-1525, PCT/CN2010071440, Huawei Technologies Co., Ltd.

Signed and Sealed this
Eleventh Day of March, 2014

Michelle K. Lee
*Deputy Director of the United States Patent and Trademark Office*